997,625. COMBINED FERTILIZER-DISTRIBUTER AND SEED-PLANTER. ALEXUS C. LINDGREN, Moline, Ill., assignor to Moline Plow Company, a Corporation of Illinois. Original application filed June 8, 1908, Serial No. 437,276. Divided and this application filed Aug. 1, 1910. Serial No. 574,897.

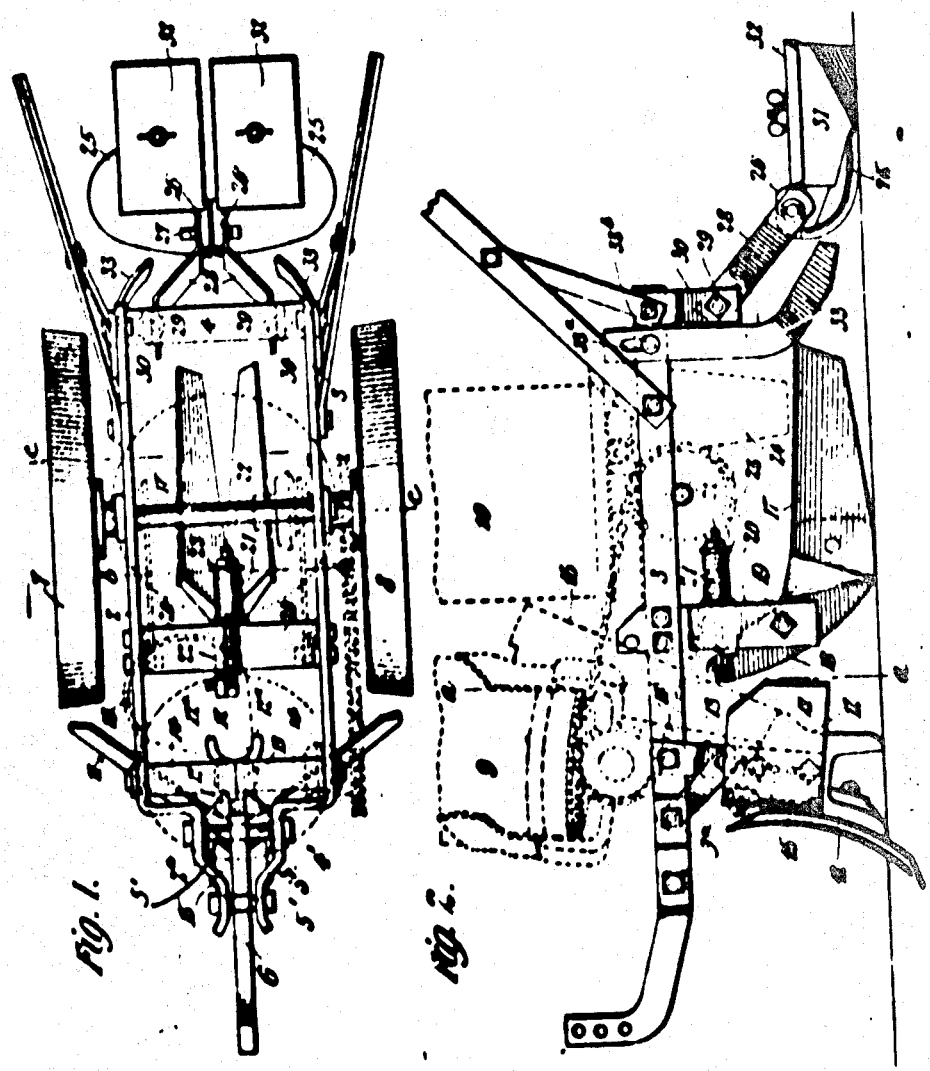

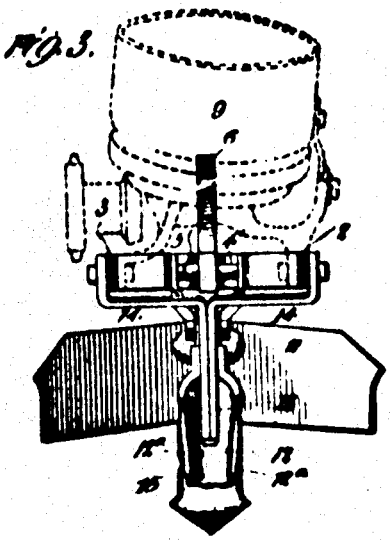
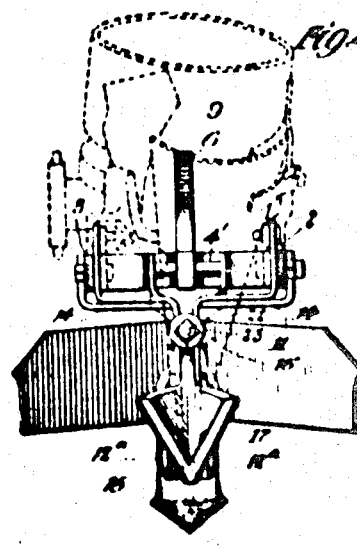
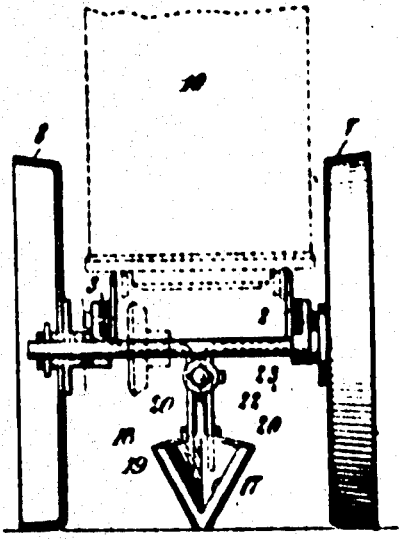
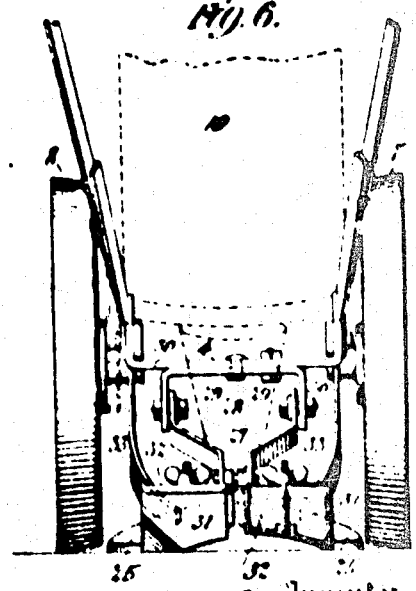

*To all whom it may concern:*

Be it known that I, ALEXUS C. LINDGREN, of Moline, county of Rock Island, and State of Illinois, have invented a new and useful Improvement in Combined Fertilizer-Distributers and Seed-Planters, of which the following is a specification, being a division of an application filed by me on the 8th of June, 1908, Serial No. 437,276.

This invention relates to a combined fertilizer distributer and seed planter for planting either corn or cotton seed, and has reference more particularly to that type of machines embodying a wheeled frame equipped with suitable furrow opening and covering devices, a fertilizer distributing device, and a seed dropping mechanism operated from the ground wheels, the machine acting as it is advanced over the field to deposit the fertilizer in a furrow, cover the same with soil, form a furrow for the seed, deposit the seed in its furrow, and finally cover the seed.

The invention consists of various improvements in the form, construction and manner of mounting the furrow opening and furrow covering devices for the seed and fertilizer, which improvements will be more fully described hereinafter and their novel features pointed out in the claims.

The invention consists also in the details of construction and combination of parts hereinafter described and claimed.

In the accompanying drawings:—Figure 1 is a top plan view of my improved machine, parts being removed to expose other parts to view. Fig. 2 is a side elevation of the same. Fig. 3 is a vertical transverse section on the line *a—a* of Fig. 2. Fig. 4 is a similar view on the line *b—b* of Fig. 1. Fig. 5 is a similar view on the line *c—c* of Fig. 1. Fig. 6 is a rear elevation of the machine partly in section.

Referring to the drawings: 1 represents a rectangular frame consisting of two longitudinally extending metal side bars 2 and 3, connected at their rear ends by a cross-bar 4, having its ends upturned and seated against and secured to the outer sides of the side bars, which latter at their forward ends extend inwardly toward each other, then longitudinally forward parallel to each other some distance apart, as at 2ª and 3ª, their forward extremities being finally curved inward toward each other, forming convex bearing surfaces. The parallel portions 2ª and 3ª of the frame, and the forward curved extremities of the same, are spaced apart and connected in fixed relation by means of spacing spools 4' and 5', respectively, as shown in Fig. 1, connected to said parts by through bolts, which spools extend loosely through openings in the rear end of a draft bar 6, to which the draft animals may be attached, the arrangement being such that said bar may rock laterally and freely on the spools between the convex portions of the frame bars.

The frame is sustained in the present instance by ground or carrying wheels 7 and 8, and gives support at its front to a fertilizer distributing device 9, and at its rear to a seed distributing mechanism, 10, the arrangement being such that as the machine advances, the fertilizer will be first deposited in the furrow and then the seed.

At its forward end, the frame is provided with a sweep 11 in the form of a plate fixed to the forward face of a frog 12 and diverging rearwardly and outwardly therefrom. The frog is recessed vertically to receive a standard 13 formed by means of two plates 14 fixed at their upper ends to the side bars of the frame and extending transversely inwardly toward each other and then downwardly vertically side by side, the downward extensions of the plates being seated in the recess in the frog, to which the latter is firmly bolted and on which it is adjustable vertically. Below the sweep the frog is extended downwardly in order to receive a furrow opening blade 15 which is seated against the front face of the extension on the frog, and to which it is firmly bolted, a number of holes being formed in the blade in order to provide for its vertical adjustment to vary the depth of the furrow. A spout 16, into the upper end of which the fertilizer is discharged, has its lower end seated immediately behind the sweep so as to direct the fertilizer into the furrow formed by the opener 15. In order that the lower end of the spout may be securely held in position and prevented from being displaced, the frog 12 has projecting rearwardly from it, two outwardly curved flanges 12ª forming between them a semicircular socket extending rearwardly and downwardly into the upper end of which the lower end of the spout fits.

Sustained by the frame in rear of the fertilizer spout is a device 17, the function of which is to cover the deposited fertilizer and at the same time form a furrow for the seed. This device consists of two longitudinal plates separated at their lower edges and extending upwardly and outwardly, forming a V-shaped space between them, their forward ends being connected togethand curved upwardly and forwardly, at which point the device is provided with an upward extension 18 pivoted on a horizontal axis 19 between the lower ends of two vertical arms 20 extending upwardly and outwardly and fixed at their outer ends to the side bars of the frame. This device is acted on by a spring 21 so arranged that it is pressed yieldingly downward on the ground. This action is effected by means of a horizontal rod 22 jointed at its forward end to the upward extension 18 and extending rearwardly between the two arms 20, a head 23 being applied to the rear end of the rod. The spring is of spiral form and encircles the rod in rear of the arms, bearing at its forward end against said arms and at its rear end against the head, and tending by its expansion to force the rod rearward, thereby pulling rearwardly on the extension 18, by which means the connected plates are forced downward at their rear ends. The seed from the seed hopper enters the upper end of a seed spout 24, the lower end of which terminates substantially between the two plates 17 at their rear ends. These plates are sustained at a considerably higher level than the forward furrow opening blade 15, so that they act at their forward curved ends on the soil thrown up at the sides of the furrow formed by the blade 15, and they force the soil downward on the fertilizer, which is covered thereby, at the same time forming a seed furrow over the covered fertilizer, into which the seed is directed by the spout 24.

In rear of the seed spout and sustained by the rear end of the frame, is a seed covering device in the form of two weighted shoes 25, provided at their forward ends with upwardly extending ears 26 connected by means of a horizontal transverse pivot bolt 27 between the lower ends of two arms 28, extending upwardly and outwardly and jointed at their upper ends by means of two horizontal transverse pivot bolts 29, to downwardly extending ears 30 fixed to the rear cross bar 4, before alluded to. The bottoms of the shoes are widened at the front, are concaved slightly on their under sides in a transverse direction, and cured upwardly at their forward ends, and as they are drawn over the ground with a floating action, they press the sides of the seed furrow inwardly and downwardly, thereby effectually covering the deposited seed and smoothing and packing the soil down thereon. The shoes are provided with boxes 31, in which sand or soil may be filled to give them the proper weight, lids 32 being provided to cover the boxes, which are held in place by nuts screwed on the upper ends of vertical bolts extending upwardly through the boxes and through the lids.

In order that the soil thrown outward by the sweep 11 may be pushed inwardly within reach of the concave surfaces of the shoes, to the end that the latter will act to effectually cover the seed, I provide at the rear end of the frame, on opposite sides, deflecting blades 33 in the form of vertical plates connected at their upper ends with the side bars of the frame, and extending downward therefrom and curved inwardly toward each other so as to extend within the outer limits of the bottoms of the shoes, and also curved rearwardly. These deflecting blades will act as the machine is advanced, to force the soil, thrown outwardly by the sweep, inwardly toward the covering shoes and within the path of the same, so that the soil is thus caused to be smoothed over and packed down on the deposited seed. These blades are connected with the frame so that they may be adjusted vertically, which is conveniently effected by forming in their upper ends vertical slots $33^a$ which receive fastening bolts $33^b$ extending through said slots and through the frame bars.

While I have shown and described my invention in the form which I prefer to adopt, yet it will be understood that it is susceptible of various embodiments and may be variously modified without departing from the spirit of my invention.

Having thus described my invention, what I claim is:—

1. In a machine of the type described, the combination of the wheeled frame, a supporting member carried thereby and adjustable vertically in relation thereto, a furrow opening blade adjustably connected to said member, a sweep in the form of a plate also connected to said member above and in rear of the furrow opening blade and extending rearwardly and outwardly therefrom and a fertilizer distributing mechanism sustained by the frame and acting to deliver the fertilizer in rear of the sweep in the furrow formed by the opening blade.

2. In a machine of the type described, the combination of the wheeled frame, a standard carried thereby, a vertically adjustable frog connected to the standard, a furrow opening blade adjustably connected to said frog, a sweep also connected to the frog above and in rear of the furrow opening blade and in the form of a plate extending rearwardly and outwardly therefrom and a fertilizer distributing mechanism sustained by the frame and acting to deliver the fertilizer in rear of the sweep in the furrow formed by the opening blade.

3. In a machine of the type described, the combination of the wheeled frame, a furrow opening device carried thereby, fertilizer distributing mechanism sustained by the frame, a spout leading therefrom, and a frog situated in rear of the furrow opening device and formed with a socket to receive the fertilizer from said spout and discharge the same into the furrow formed by said device.

4. In a machine of the type described, the combination of the wheeled frame, a standard carried thereby, a frog adjustably connected to said standard and formed with a socket in its rear wall, a furrow opener fixed to the front wall thereof, distributing mechanism sustained by the frame, and a spout leading therefrom and having its lower end seated in and loosely confined in position by the socket in the frog.

5. In a machine of the type described, the combination of the frame, a furrow opener thereon, a fertilizer distributing mechanism, longitudinally extending connected plates sustained by the frame in position to cover the deposited fertilizer and acting to open a furrow for the seed, a seed discharging mechanism sustained by the frame and acting to deposit the seed in the furrow formed by the connected plates, and means for covering the deposited seed.

6. In a machine of the type described, the combination of a frame, a furrow opener thereon, a fertilizer distributing mechanism sustained by the frame, two plates extending longitudinally, connected at their forward ends and disposed so as to leave between them a V-shaped space open at the bottom, said plates being sustained by the frame in position to cover the deposited fertilizer and acting to open a furrow for the seed, a seed discharging mechanism sustained by the frame in position to deliver the seed between said plates, and means for covering the deposited seed.

7. In a machine of the type described, the combination of a frame, a furrow opener thereon, a fertilizer distributing mechanism sustained by the frame, two connected longitudinally extending plates inclining upwardly and outwardly and sustained in position to cover the deposited fertilizer and acting to form a furrow for the seed, a seed discharging mechanism mounted in the frame in position to direct the seed between said plates at their rear ends, and means for covering the deposited seed.

8. In a machine of the type described, the combination of a frame, a furrow opener carried thereby, a fertilizer distributing mechanism acting to deposit the seed in the furrow formed by said opener, a vertically movable device sustained by the frame in position to act on the soil and cover the deposited fertilizer and acting to form a furrow for the seed, a spring acting to hold said device yieldingly downward, a seed discharging mechanism acting to deposit the seed in the furrow, and means for covering the deposited seed.

9. The combination of the frame, a furrow opener mounted thereon, a fertilizer distributing mechanism acting to deposit the fertilizer in the furrow formed by said opener, a standard on the frame extending downwardly, two longitudinally extending plates disposed with a space between them open at its bottom and connected together and jointed to said standard, a rod jointed to said plates at the point of connection and extending longitudinally, a spring encircling the rod and bearing thereon and against said standard; whereby the spring will tend to press said plates downward yieldingly on the surface of the ground, a seed discharging mechanism acting to deliver the seed between the plates, and means for covering the deposited seed.

10. In a machine of the type described, the combination of the frame, a furrow opener at the front, a sweep situated in front of the frame above the furrow opener and consisting of a plate having its ends extending outwardly and rearwardly, a fertilizer distributing mechanism sustained by the frame and acting to discharge the fertilizer in the furrow formed by the opener, a device sustained by the frame in rear of the sweep in position to cover the deposited fertilizer and acting to form a seed furrow, a seed discharging mechanism mounted on the frame in position to deliver the seed in the seed furrow, a covering device at the rear end of the frame, and blades carried by the frame at the rear in position to push the surface soil thrown outwardly by the sweep, within reach of the covering device.

In testimony whereof I hereunto set my hand this 16th day of July, 1910, in the presence of two attesting witnesses.

ALEXUS C. LINDGREN.

Witnesses:
L. C. BLANDING,
C. W. BANISTER.